UNITED STATES PATENT OFFICE.

MELCHIOR BÖNIGER, OF BASLE, SWITZERLAND, ASSIGNOR TO FIRM OF CHEMICAL WORKS FORMERLY SANDOZ, OF BASLE, SWITZERLAND.

BROWN SULFUR DYE AND PROCESS OF MAKING SAME.

SPECIFICATION forming part of Letters Patent No. 712,176, dated October 28, 1902.

Application filed May 23, 1902. Serial No. 108,735. (Specimens.)

*To all whom it may concern:*

Be it known that I, MELCHIOR BÖNIGER, doctor of philosophy, residing at Fabrikstrasse 116, Basle, Switzerland, have invented new and useful Improvements in the Manufacture of Brown Sulfur Dyes, of which the following is a specification.

By condensation of the easily-prepared 1.2 naphthoquinone 4 sulfonic acid with primary aromatical amido compounds β-oxynaphthoquinonalphylimids are obtained, corresponding to the general formula

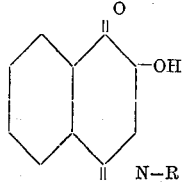

(See Böniger, *Berichte der Deutschen Chem. Ges.* XXVII.) Now I have found that on heating the aforesaid β-oxynaphthoquinonimido compounds with alkali polysulfids at elevated temperatures new sulfur dyes can be produced. The condensation products of the 1.2 naphthoquinone 4 sulfonic acid with p-amidophenol and its derivatives yield thereby olive to brownish-black dyestuffs of less interest, whereas the bronze to dark-brown sulfur dyes, deriving from the β-oxynaphthoquinonalphylimido and β-oxynaphthoquinonnitro or amidoalphylimidosulfonic and carbonic acids are of high technical value on account of their excellent fastness against acids, soap, alkalies and light.

The most yellowish shades of bronze-brown can be obtained by using the condensation products of 1.2 naphthoquinone 4 sulfonic acid with anilinsulfonic and carbonic acids in the melt with alkali polysulfids, the methylated anil compounds deriving from toluidin, xylidin, cumidinsulfonic acids yield more brownish tints, and the darkest-brown shades are obtained by starting from the β-oxynaphthoquinone m-amido or m-nitro alphylimido sulfonic acids deriving from the condensation of 1.2 naphthoquinone 4 sulfonic acid with the m-nitrotoluidin sulfonic acids or with the m-toluylendiamin sulfonic acids.

The melting process with the alkali polysulfid must be carried out at elevated temperatures, preferably between 240° to 300° centigrade, according to the following example:

Example: Two hundred and fifty kilograms of crystallized sodium sulfid and fifty kilograms of sulfur are heated in an iron vessel provided with a stirring mechanism at 120° centigrade, and fifty kilograms of β-oxynaphthoquinonanil p-sulfonic acid obtained from 1.2 naphthoquinone 4 sulfonic acid and sulfanilic acid in a solution of neutral reaction are added thereto. The temperature is then slowly raised to 200° centigrade, stirring well all the time. As soon as the melt becomes thick it is poured on flat iron plates and now heated during six to eight hours in an oven to 260° to 280° centigrade. The thus-obtained dyestuff forms a dark-brown brittle mass which can easily be powdered and used directly in this form for dyeing purposes. It is easily soluble in water with yellowish-brown color, which is not altered on addition of alkalies, being, however, precipitated in brown flakes by acids and chlorid of barium.

The new dyestuff is insoluble in benzene, toluene, and also in strong sulfuric acid and dissolves but sparingly in boiling spirit with yellowish-brown color. It dyes unmordanted cotton in a bath containing common salt bronze shades, absolutely fast to washing, alkalies, acids, and resisting also very well to the action of light. A subsequent treatment with oxidizing agents, as bichromates, or with metallic salts does not alter the shades and is of no value, the fastness of the directly-obtained shades being sufficient for all practical requirements.

Similar dyestuffs, varying only in their shades, are obtained by substituting in the foregoing example the β-oxynaphthoquinonanil p-sulfonic acid by other β-oxynaphthoquinonalphylimido compounds.

Now what I claim, and desire to secure by Letters Patent, is the following:

1. The process of manufacturing brown sulfur dyes which consists in heating β-oxynaphthoquinonalphylimido compounds with alkali polysulfids at elevated temperatures, substantially as herein described.

2. As new articles of manufacture the brown sulfur dyes derived from the β-oxynaphthoquinonalphylimids hereinbefore described by the action of compounds containing alkali polysulfids forming dark-brown powders, dissolving in water with brown color, unalterable by alkalies, precipitating in brown flakes on addition of acids or barium chlorid, being insoluble in benzene and toluene, sparingly soluble in boiling spirit with brown color and dyeing unmordanted cotton in a salt bath containing alkali sulfid in brown shades, substantially as described.

In testimony whereof I have signed my name to this specification in the presence of two subscribing witnesses.

MELCHIOR BONIGER.

Witnesses:
 GEORGE GIFFORD.
 ARNOLD FREINER.